United States Patent Office 2,721,185
Patented Oct. 18, 1955

2,721,185

VULCANIZED LIQUID POLYMERS AS RUBBER PLASTICIZERS

Walter A. Schulze and Willie W. Crouch, Bartlesville, Okla., assignors to Phillips Petroleum Company, a corporation of Delaware No Drawing. Application January 2, 1951,
Serial No. 204,064

15 Claims. (Cl. 260—5)

This invention relates to elastomer compounding. In a more specific aspect this invention relates to new softeners, plasticizers and/or tackifiers for elastomers, synthetic and/or natural. In a still more specific aspect this invention relates to vulcanized liquid conjugated diolefin polymers as softeners, plasticizers and/or tackifiers for synthetic and/or natural rubber.

Various types of materials have been employed as softeners, tackifiers and/or plasticizers for both natural and synthetic rubbers and it is known that variations in properties of rubber products can be produced through the use of different plasticizing agents. A good plasticizer, in addition to softening a rubber stock, must give a finished product with other desirable properties. Some materials which exert the desired plasticizing action often have deleterious effects on other properties to the extent that the finished products are of little value for many purposes. One of the disadvantages of many synthetic elastomers is that they do not possess sufficient tack. For this reason many synthetic elastomers are not desirable to use in carcass stocks. A plasticizer which gives a product of improved tack as well as other good physical properties is highly desirable.

We have now discovered that vulcanized liquid conjugated diolefin polymers are good rubber plasticizers and tackifiers and also give products with other desirable properties. The new softeners, plasticizers and/or tackifiers of our invention can very advantageously be used in carcasses wherein synthetic elastomers are used. These vulcanized plasticizers are prepared from liquid conjugated diolefin polymers which latter are prepared from conjugated diolefin hydrocarbons, preferably containing from 4 to 8 carbon atoms per molecule, such as 1,3-butadiene, isoprene, 2,3-dimethyl-1,3-butadiene, piperylene, 2-methyl-1,3-pentadiene, 4-methyl-1,3-pentadiene, 2,4-dimethyl-1,3-pentadiene, and the like, either polymerized alone or in mixtures with each other or with a vinyl compound copolymerizable therewith, such as hydrocarbon compounds containing a terminal $CH_2=C<$ group, such as styrene, methyl substituted styrenes, etc. Monomers and comonomers which are inert to alkali metals or alkali metal hydrides other than in a catalytic sense are preferably used to produce the unvulcanized polymers. The general method for the preparation of these unvulcanized liquid polymers is described in copending application Serial No. 67,098, filed December 23, 1948, now Patent 2,631,175, granted March 10, 1953. The plasticizing and tackifying agents of this invention are applicable in compounding both natural and synthetic rubbers. Their chief value, however, lies in their use in synthetic rubber which frequently does not possess sufficient tack for some uses. They can be used alone as softeners and tackifiers in a compounding recipe or as mixtures with each other or in conjunction with other softeners. They have been found to be much more effective in their tackifying action than unvulcanized liquid conjugated diolefin polymers or commercial softeners, such as those of the asphalt type (Asphalt #6), blends of a petroleum hydrocarbon softener (Circosol–2XH, a petroleum hydrocarbon material, containing hydrocarbons of high molecular weight, in the form of a heavy, viscous, transparent, pale green, odorless liquid of low volatility; sp. gr. 0.940; Saybolt viscosity at 100° F., about 2,000 seconds) with an asphaltic flux (Paraflux), and the like. In addition to being good tackifiers, these vulcanized liquid conjugated diolefin polymers are valuable for use in rubbers of the Perbunan type, i. e., butadiene-acrylonitrile copolymers, since they give products which show high swelling and low extractability characteristics. One of the important advantages of these materials, in addition to their good tackifying action, is that they incorporate into a rubber stock on the mill much more readily than the corresponding unvulcanized liquid conjugated diolefin polymers or commercial softeners, such as blends of Circosol–2XH with Paraflux as described above.

It is an object of this invention to provide new elastomer compounding methods and additives and elastomer mixes.

Another object of this invention is to provide new elastomer compounding additives and new elastomer products resulting from their use.

It is another object of this invention to provide new softeners, plasticizers and/or tackifiers for elastomers, synthetic and/or natural, and new elastomer products with improved properties resulting from the use of such softeners, plasticizers and/or tackifiers.

Other objects and advantages of this invention will become apparent, to one skilled in the art, upon reading this disclosure.

The term "rubber," as used in this disclosure, is intended to cover both natural and synthetic rubbers. In its broadest aspect, our invention applies to providing softeners, plasticizers and/or tackifiers for vulcanizable organic elastomers containing unsaturated carbon to carbon bonds. Our invention applies to softening, plasticizing or tackifying natural rubber or rubber-like polymers produced by the polymerization of aliphatic conjugated diolefins, particularly those having 4 to 8 carbon atoms per molecule, such as butadiene, isoprene, pentadienes, etc., or the co-polymerization of such diolefins with a compound containing a $CH_2=C<$ group copolymerizable therewith, such as styrene, acrylonitrile, etc. Examples of such elastomers are polymers of butadiene-styrene, isoprene-styrene, butadiene acrylonitrile, polybutadiene, etc. The softeners, plasticizers, or tackifiers of our invention can be used with butyl rubber stocks which are produced by co-polymerizing a major quantity of isobutylene, with a minor quantity of a conjugated diolefin, such as those mentioned hereinbefore. The softeners, plasticizers, or tackifiers of our invention can be used with reclaimed natural or synthetic rubbers and to various mixtures of natural, synthetic, reclaimed natural and reclaimed synthetic rubber. They are particularly valuable in improving the tack of low temperature synthetic elastomers, the relatively newly developed butadiene-styrene elastomers produced by emulsion polymerization at temperatures in the range of −20 to 15° C. being improved particularly well. In the preparation of these low temperature elastomers the monomers charged are usually from 50 to 85 weight per cent butadiene.

The unvulcanized liquid conjugated diolefin polymers employed in the preparation of the vulcanized plasticizers and/or tackifiers used in the practice of this invention are not rubber-like synthetic polymers, but are non-rubber-like liquid polymers free from solid polymers. The molecular weight of these compounds is usually within the range of 500 to 5000 (determination made with polymer dissolved in a solvent) and the viscosity from 100 to 600 Saybolt Furol seconds at 100° F. Unsaturation can be determined by the iodine monochloride method of Kolthoff (Lee, Kolthoff, and Mairs, J. Polymer Science 3, No. 1, 66 (1948)). As an indication of the unsaturation of these polymers, a determination made on a liquid polybutadiene sample of molecular weight 2000 showed an unsaturation of 0.79 double bond per butadiene unit which is equivalent to an iodine number of 371.

The liquid polymers which are vulcanized to form the plasticizers and tackifiers of our invention are prepared by mass polymerization, that is, polymerization with or without an inert reaction medium and catalyzed by a finely divided alkali metal and/or alkali metal hydride, such as sodium, potassium, lithium, sodium hydride, potassium hydride, lithium hydride, and the like. Polymers thus prepared contain no modifier or viscosity controlling agent and they are also free from materials which would act as antioxidants. Finely divided catalyst is used, preferably with a particle size below 200 microns, more preferably below 100 microns in the range of 40 to 80 microns. The amount of catalyst employed usually does not exceed 2 parts by weight, preferably in the range 0.5 to 1.5 parts by weight, per 100 parts by weight of the total monomer charged. When mass polymerization methods are employed, liquid products are readily obtained by controlling the temperature, pressure, amount of catalyst, kind and amount of solvent, and the like, with no additional materials being necessary to control the viscosity of the polymer. The polymerization is usually carried out in the presence of a solvent, such as paraffinic hydrocarbons, especially the light normally liquid paraffins such as pentanes, hexanes, heptanes; certain naphtha fractions, preferably having not over 10 carbon atoms per molecule; cycloparaffins, such as cyclohexane; aromatic hydrocarbons, such as benzene, toluene, other lower alkylbenzenes; and the like. The preferred temperature for carrying out the polymerization lies in the range from 60 to 110° C. However, a narrower temperature range of from 85 to 100° C. is most frequently chosen. A more complete description of the process of making the polymer to be vulcanized to form the plasticizer can be found in copending application, Serial No. 67,098, filed December 23, 1948.

The consistency of the vulcanized liquid conjugated diolefin polymers which are employed as plasticizers will vary depending upon the viscosity and molecular weight of the polymer used, the amount of vulcanizing agent, accelerator, etc. employed in the vulcanization, and the time and temperature of vulcanization. These vulcanized polymers range from fairly tough, rubbery materials to soft, tacky, and very viscous, semi-fluid products.

Known vulcanizing methods and agents can be used to vulcanize the liquid polymers. We prefer to use sulfur as the vulcanizing agent. Accelerators are generally used. The amount of sulfur employed in the vulcanization of the liquid conjugated diolefin polymers is usually in the range from 0.5 to 7 parts by weight per 100 parts by weight polymer with 3 to 6 parts by weight being preferred. In instances where it is desired to use a large amount of the plasticizer in the processing of a rubber stock, such as more than 10 parts, larger amounts of sulfur can be employed in the preparation of the plasticizer, e. g., up to 10 or 15 parts. In still other cases, such as when the vulcanized polymer is to be used as a softener in a butadiene-acrylonitrile rubber to give a product with high swelling and low extractability characteristics, more sulfur is frequently used, even up to 15 or more parts. Rubber products thus prepared are suitable for gasket manufacture, linings for fuel tanks, and the like.

Vulcanization temperature depends upon the accelerator employed and will usually be in the range from 150 to 300° F.

Vulcanization time will usually be in the range from 0.5 to 8 hours and preferably from 2 to 5 hours.

The amount of vulcanized plasticizer employed will vary depending upon the type of polymer being processed and the properties desired in the finished product. It will usually be in the range from 1 to 10 parts but in some instances can be used in amounts up to 20 or 25 parts. As hereinbefore mentioned, these vulcanized polymers can be employed in conjunction with other softeners. The vulcanized plasticizers can be incorporated into the rubber on a mill, in a Banbury mixer, etc., or, if preferred, they can be added to the latex. They can be added to the rubber before, during or after the addition of other compounding ingredients.

Vulcanizable organic elastomer compositions usually contain fillers; modifiers; softeners, tackifiers, and plasticizing substances; vulcanizing agents; age resistors or antioxidants; and accelerators of vulcanization. The exact composition of the vulcanizable organic elastomer composition depends upon the use to which the vulcanizable composition is to be put. The new softeners, plasticizers or tackifiers of our invention can be used in all of the commonly used compounding recipes.

Carbon black is added to many vulcanizable organic elastomer mixes during compounding as a filler. There are many types of carbon blacks used today in compounding, among which are: recently developed high pH furnace carbon blacks having a pH of from 8.0 to 10.5, usually 8.6 to 10.1, such as high abrasion furnace carbon blacks (HAF blacks), super abrasion furnace carbon blacks (SAF blacks) and high modulus furnace carbon blacks (HMF blacks); reinforcing furnace blacks (RF blacks) and very fine furnace blacks (VFF blacks); easy, medium, or hard processing channel blacks; lamp blacks; fine and medium thermal carbon blacks; acetylene carbon blacks; semi-reinforcing furnace carbon blacks; conductive furnace and conductive channel carbon blacks; and high elongation furnace carbon blacks. Other pigments or additives, such as ferric oxide, magnesium carbonate, titanium dioxide, zinc oxide, hydrated alumina, kieselguhr, slate dust, zinc peroxide, zinc chloride, lead peroxide, lead oxide, chlorinated paraffins, glue, barytes, fossil flour, lithopone, various clays, finely divided silica, whiting, etc. can be added as fillers or to modify the properties of the vulcanizable composition or vulcanized composition, such properties as the rate of cure, resistance to scorching during processing, activation of acceleration, etc.

Other softeners, tackifiers and plasticizing substances can be used in conjunction with the softeners, tackifiers and plasticizing materials of this invention, if desired. There are many such substances, among which are vegetable oils, such as palm oil, rape oil, olive oil, linseed oil, castor bean oil, soya bean oil, tung oil; bitumens including so-called mineral rubbers, which comprise natural products, such as gilsonite, rafaelite, and also high-boiling petroleum residues, asphalts, etc.; pine tar; paraffin wax; mineral oils; fatty acids, such as oleic acid, stearic acid, palmitic acid, lauric acid, etc.; ceresin; naphthalenes; rosin; wool grease; carnauba wax; the many organic chemical compounds, such as glycerol, glyceryl monostearate, glyceryl mon-oleate, glyceryl monoricinoleate, trioctyl phosphate, triglycol dioctoate, ethylene glycol monostearate and the mono-oleate, phenol-formaldehyde thermosetting resins, poly-alpha-methyl styrene, and other polymers of styrene and substituted styrene, dioctyl phthalate, dioctyl sebacate, polybutenes, zinc resinate, coumarone resins, dihydroabietic acid, etc. Some of these compounds aid tackiness as well as soften or plasticize the vulcanizable organic elastomers. Also, some of them exhibit modifying characteristics.

Vulcanizing agents are added to vulcanize the organic elastomers during the vulcanization step of processing. There are a wide variety of vulcanizing agents, such as: sulfur, including powdered sulfur, or in one or more other forms, and mixtures thereof; so-called plastic sulfurs; sulfur-containing compounds, such as sulfur chloride, hydrogen sulfide, sulfur thiocyanate, tetraalkylthiuram disulfides, etc.; selenium; tellurium; benzoyl peroxide; trinitrobenzene; dinitrobenzene; nitrobenzene; quinones; certain inorganic oxidizing agents; diazoaminobenzene and its derivatives; other nitrogen-containing compounds, etc. Such vulcanizing agents can be used to vulcanize the liquid polymers to produce the vulcanized plasticizers of this invention.

Accelerators of vulcanization are added to accelerate vulcanization during the vulcanization step of processing. There are many other known accelerators of vulcanization, such as: thioureas; thiophenols; mercaptans; dithiocarbamates; xanthates; trithiocarbamates; dithio acids, mercaptothiazoles; mercaptobenzothiazoles; thiuram sulfides; organic-cobalt chelates; etc., and various mixtures thereof. Some widely used and particularly good accelerators are, for instance, mercaptobenzothiazole, benzothiazyl disulfide, diphenylguanidine, zinc salt of mercaptobenzothiazole, zinc benzothiazyl sulfide, tetramethylthiuram disulfide, N-cyclohexyl-2-benzothiazole sulfenamide, aldehyde-ammonias, triphenylguanidine, zinc dibutyl and zinc dimethyl dithiocarbamate, many others, and mixtures thereof. Such accelerators can be used in vulcanizing the liquid polymers to produce the vulcanized plasticizers of this invention.

In most cases it is the usual practice to add age resistors or antioxidants to vulcanizable organic elastomer mixes during the mixing step of processing in order to slow down or prevent the deterioration of the vulcanized product. Antioxidants or age resistors have the property of maintaining tensile strength, resistance to abrasion, elasticity, preventing flex cracking, etc. One or more antioxidants are usually employed, such as phenyl-beta-naphthylamine, p-aminophenol, hydroquinone, p-hydroxydiphenyl, diphenylamine, 2,4 - toluenediamine, p - ditolylamine, o-ditolylamine, beta-naphthyl-nitrosoamine, N,N-diphenyl diaminoethane, phenyl-alpha-naphthylamine, p,p-diaminodiphenylmethane, etc.

The vulcanizable organic elastomer compositions resulting from admixing the various ingredients with the new softeners, plasticizers and/or tackifiers of our invention by the methods known in the prior art, are vulcanized in the usual manner after they are molded or shaped into the desired shape by the numerous shaping operations of the prior art, such as calendering, casting from solution, continuous or discontinuous extrusion, molding in open or closed molds, etc., and they can be used for the many purposes for which other similar compositions are used. For example, they can be used for tire tubes, tire treads, tire casings, shoe soles and heels, raincoats, table covers, hose for the transmission of fluids, belts, balloon coverings, printers rolls, printers blankets, engraving plates, aprons, gloves, masks, tanks, battery cases, friction tape mats, wire insulation, etc. Fabrics can be coated or impregnated by calendering or impregnation with a suitable emulsion. The new softeners, plasticizers and/or tackifiers of our invention are particularly valuable in compounding carcass stocks, such as tire carcasses wherein from 10 to 35 parts by weight of carbon black per 100 parts by weight of elastomer are usually used.

The following are set forth as examples of our invention. It is to be understood that the quantities, materials, etc., set forth in the following examples are not to unduly limit the scope of our invention.

Example 1

Liquid polybutadiene was prepared by polymerization of butadiene, in the presence of sodium catalyst, using normal heptane as a diluent. Butadiene was fed into the reactor at a constant rate to maintain the temperature at 200 to 206° F. The pressure was about 10 p. s. i. g. The process was operated to build up a concentration of 40 per cent polymer in the diluent in three hours. The amount of sodium catalyst, based upon the total butadiene charged, was 1.25 weight per cent. At the conclusion of the reaction the catalyst was removed by extraction of the reaction product with sulfuric acid, isopropanol, and water. The polymer thus prepared had a viscosity of 460 Saybolt Furol seconds at 100° F.

The liquid polybutadiene described above was used for the preparation of a series of vulcanized liquid polybutadiene plasticizers employing variable amounts of sulfur and curing temperatures at 210 and 270° F. The amounts of materials employed in the preparation of the plasticizers, per 100 parts of liquid polybutadiene, together with the curing temperature and time, are shown in the following tabulation:

| Sample No. | Sulfur, Parts | Tuads,[1] Parts | Butyl Zimate, Parts | Stearic Acid, Parts | Curing Process Temp., °F. | Curing Process Time, Hours |
|---|---|---|---|---|---|---|
| 1 | 5 | 2 |   | 2 | 270 | 2 |
| 2 | 5 |   | 2 | 2 | 210 | 5 |
| 3 | 10 | 2 |   | 2 | 270 | 2 |
| 4 | 15 | 2 |   | 2 | 270 | 2 |
| 5 | 10 |   | 2 | 2 | 210 | 5 |

[1] Tetramethylthiuram disulfide.

The above described plasticizers were evaluated in a rubber prepared at 5° C. according to the following recipe:

|   | Parts by weight |
|---|---|
| Water | 180 |
| Butadiene | 72 |
| Styrene | 28 |
| Sodium alkaryl sulfonate | 0.75 |
| Mercaptan blend [1] | 0.31 |
| Diisopropylbenzene hydroperoxide | 0.097 |
| KOH | 0.04 |
| $K_4P_2O_7$ | 0.177 |
| $FeSO_4 \cdot 7H_2O$ | 0.14 |

[1] A blend of tertiary $C_{12}$, $C_{14}$ and $C_{16}$ aliphatic mercaptans in a ratio of 3 : 1 : 1 parts by weight.

Prior to coagulation, 0.5 part potassium rosin soap (Dresinate 214) was added. A conversion of 60 per cent was reached in 21.5 hours. The polymer had a Mooney value of 58.

The vulcanized liquid polybutadiene plasticizers were evaluated in the 58 Mooney rubber prepared as described above using 5 and 25 parts plasticizer loadings per 100 parts rubber. Two controls were run, one (control A) using a blend of equal parts of Circosol-2XH (a petroleum hydrocarbon softener, containing hydrocarbons of high molecular weight, in the form of a heavy, viscous, transparent, pale green, odorless liquid of low volatility; sp. gr. 0.940; Saybolt viscosity at 100° F., about 2000 seconds) and Paraflux (an asphaltic flux), and the other (control B) using unvulcanized liquid polybutadiene with a viscosity of 460 Saybolt Furol seconds at 100° F.

The following compounding recipe was employed:

|   | Parts by weight |
|---|---|
| Butadiene/styrene elastomer | 100 |
| Carbon black [1] | 50 |
| Zinc oxide | 3 |
| Stearic acid | 1 |
| Flexamine [2] | 1 |
| Sulfur | 1.75 |
| Santocure [3] | 1 |
| Plasticizer | 5, 25 |

[1] Philblack O, a high abrasion furnace carbon black.
[2] A non-toxic powder, sp. gr. 1.10, m. p. 75–90° C., consisting of a physical mixture containing 65 per cent of a complex diarylamine-ketone reaction product and 36 per cent of N,N'-diphenyl-p-phenylenediamine.
[3] N-cyclohexyl-2-benzothiazolesulfenamide.

The stocks were milled and cured 30 minutes at 307°

F. and physical properties determined. The following results were obtained with 5 parts softener loading:

| Sample No. | 80° F. | | | 200° F.* Tensile p.s.i. | ΔT. ° F. | Percent Resilience | Flex Life, M | Shore Hardness | Abrasion Loss,** grams | Percent Compression Set | MS 1½ at 212° F. | Extrusion at 250° F., grams/min. | Meter Tack Sep. Load | | Minutes to add Softener |
| --- | --- | --- | --- | --- | --- | --- | --- | --- | --- | --- | --- | --- | --- | --- | --- |
| | 300% Modulus p.s.i. | Tensile, p.s.i. | Percent Elongation | | | | | | | | | | (1) | (2) | |
| 1 | 1,680 | 3,920 | 540 | 2,000 | 71.9 | 64.4 | 30.3 | 60.5 | 5.41 | 16.3 | 46.5 | 104 | 75 | 175 | 3 |
| 2 | 1,830 | 3,800 | 500 | 1,870 | 69.9 | 65.3 | 26.3 | 60 | 5.31 | 13.0 | 47 | 103 | 150 | 185 | 2.5 |
| 3 | 1,950 | 3,900 | 495 | 2,210 | 69.9 | 63.7 | 37.4 | 62 | 5.69 | 16.1 | 49.5 | 105 | 15 | 65 | 1 |
| 4 | 2,010 | 4,160 | 510 | 2,070 | 70.3 | 65.2 | 33.5 | 62 | 6.26 | 17.1 | 50 | 100 | 15 | 70 | 1 |
| 5 | 2,010 | 4,000 | 500 | 1,870 | 67.2 | 64.8 | 31.7 | 61 | 5.90 | 13.0 | 48.5 | 100 | 30 | 60 | 1 |
| Control A | 1,730 | 4,000 | 540 | 1,920 | 70.3 | 64.9 | 35.1 | 59 | 5.30 | 17.7 | 46 | 103 | 25 | 125 | 4 |
| Control B | 1,610 | 3,830 | 550 | 1,920 | 72.3 | 64.0 | 34.5 | 59 | 5.24 | 17.2 | 45 | 105 | 50 | 150 | 4 |
| OVEN-AGED 24 HOURS AT 212° F. | | | | | | | | | | | | | | | |
| 1 | 3,050 | 3,740 | 350 | | 61.2 | 70.9 | 11.9 | 67 | 6.65 | | | | | | |
| 2 | 2,790 | 3,330 | 340 | | 62.8 | 70.6 | 8.5 | 67 | 5.92 | | | | | | |
| 3 | 3,330 | 3,710 | 320 | | 64.2 | 69.1 | 9.7 | 69 | 6.79 | | | | | | |
| 4 | 3,430 | 3,880 | 330 | | 63.5 | 70.6 | 6.5 | 69 | 7.36 | | | | | | |
| 5 | | 3,300 | 300 | | 63.2 | 68.7 | 6.4 | 68 | 6.85 | | | | | | |
| Control A | 2,880 | 3,500 | 350 | | 59.1 | 70.6 | 10.2 | 67 | 6.58 | | | | | | |
| Control B | 2,830 | 3,520 | 355 | | 64.2 | 69.2 | 26.0 | 65 | 6.34 | | | | | | |

Control A: Circosol 2XH—Paraflux blend.
Control B: Unvulcanized liquid polybutadiene.
*45 Minute cure.
**35 Minute cure.
(1) One day after milling.
(2) Eight days after milling.

The preceding data show that rubber of excellent tack is obtained when the plasticizer contains less than 10 parts sulfur (samples 1 and 2) and that with 10 or more parts sulfur the tack is markedly decreased (samples 3, 4, and 5). The data also show that the vulcanized plasticizers incorporate into the rubber at a more rapid rate than the controls.

The following results were obtained with 25 parts plasticizer loading at 30 minutes cure time:

| Plasticizer Sample No. | 80° F. | | | 200° F. Tensile, p.s.i. | ΔT. ° F. | Percent Resilience | MS 1½ at 212° F. | Meter Tack |
| --- | --- | --- | --- | --- | --- | --- | --- | --- |
| | 300% Modulus, p.s.i. | Tensile, p.s.i. | Percent Elongation | | | | | |
| 1 | 820 | 3,190 | 710 | 1,460 | 68.9 | 58.4 | 32.5 | 155 |
| 2 | 1,060 | 3,200 | 590 | 960 | 60.2 | 60.8 | 33.5 | 160 |
| 3 | 1,480 | 3,270 | 545 | 1,740 | 63.2 | 54.0 | 41 | 140 |
| Control A | 570 | 3,260 | 790 | 1,500 | 75 | 62.2 | 26 | 120 |
| Control B | 330 | 2,470 | 780 | 1,100 | 131.8 | 58.9 | 22.5 | 50 |
| OVEN-AGED 24 HOURS AT 212° F. | | | | | | | | |
| 1 | 1,530 | 3,100 | 500 | | 63.2 | 61.7 | | |
| 2 | 1,660 | 2,750 | 445 | | 58.5 | 63.9 | | |
| 3 | 2,350 | 3,150 | 400 | | 60.8 | 56.9 | | |
| Control A | 1,490 | 3,000 | 520 | | 56.8 | 68.0 | | |
| Control B | 900 | 2,900 | 620 | | 74.0 | 62.8 | | |

*Example II*

Two samples of liquid polybutadiene prepared by mass polymerization methods and having viscosities of 460, and 5780 Saybolt Furol seconds at 100° F., respectively, were employed for the preparation of a series of vulcanized plasticizers. A vulcanized plasticizer was also prepared from a liquid butadiene-styrene copolymer, prepared by mass polymerization methods wherein the charge ratio was 70:30 parts by weight butadiene to styrene and having a viscosity of 1340 Saybolt Furol seconds at 100° F. The materials were then incorporated into the 5° C. rubber as described in Example I using the same compounding recipe with a plasticizer loading of 5 parts. The stocks were milled and cured 30 minutes at 307° F. and the tack determined. Two controls, A and B, as described in Example I, were run. The method of preparation of the plasticizers, together with the tack measurements, are shown below.

| Plasticizer Used Prepared from— | Visc., SFS at 100° F. | Sulfur, Parts | Butyl Zimate, Parts | Vulc. Time, Hours | Vulc. Temp., ° F. | Tack, grams |
| --- | --- | --- | --- | --- | --- | --- |
| Polybutadiene | 460 | 1.5 | 2 | 5 | 210 | 160 |
| Do | 460 | 3 | 2 | 5 | 210 | 170 |
| Do | 460 | 4 | 2 | 5 | 210 | 180 |
| Do | 460 | 5 | 2 | 5 | 210 | 190 |
| Do | 460 | 6 | 2 | 5 | 210 | 165 |
| Do | 460 | 3 | 2 | 8 | 210 | 155 |
| Do | 460 | 5 | 2 | 3 | 210 | 200 |
| Do | 460 | 5 | 2 | 8 | 210 | 165 |
| Do | 460 | 5 | 1 | 5 | 210 | 150 |
| Do | 460 | 5 | 2 | 1.5 | 250 | 160 |
| Do | 460 | 5 | 1 | 2.3 | 250 | 135 |
| Do | 460 | 3 | 2 | 8 | 250 | 165 |
| Butadiene/styrene Copolymer | 1,340 | 3 | 2 | 5 | 210 | 110 |
| Polybutadiene | 5,180 | 5 | 2 | 2 | 210 | 115 |
| Do | 5,180 | 3 | 2 | 1.7 | 210 | 120 |
| Control A | | | | | | 70 |
| Control B | | | | | | 100 |

Example III

Samples of the five vulcanized liquid polybutadiene plasticizers prepared in Example I were employed as softeners for a butadiene-acrylonitrile copolymer, prepared by emulsion polymerization methods wherein the charge ratio was 74:26 parts by weight butadiene to acrylonitrile, using the following compounding recipe:

| | Parts by weight |
|---|---|
| Butadiene/acrylonitrile copolymer | 100 |
| Carbon black [1] | 60 |
| Zinc oxide | 5 |
| Stearic acid | 1.5 |
| Sulfur | 1.5 |
| Benzothiazyl disulfide [2] | 1.5 |
| Plasticizer | 10 |

[1] Philblack A, medium abrasion furnace black.
[2] Altax.

Three controls were run using, instead of a vulcanized plasticizer, the following: (1) unvulcanized liquid polybutadiene with a viscosity of 460 Saybolt Furol seconds at 100° F.; (2) tri-2-ethylhexyl phosphate (Flexol TOF); and (3) a high molecular weight polyether (TP–90B, a non-toxic, light-straw to brown-colored liquid with little or no odor; sp. gr. 0.967; B. P. at 4 mm. pressure, 200° C. and at 760 mm. pressure, 660–760° F.; viscosity at 27° C., 8 cps.).

The samples were mixed and cured at 307° F. for 30 minutes and the physical properties determined. Swelling and extractability tests were made on the cured samples by immersing them in a mixture containing 30 per cent toluene and 70 per cent isooctane at room temperature (78–80° F.) for seven days. The following results were obtained:

Example IV

Vulcanized liquid polybutadiene was evaluated as a plasticizer in a 14° F. rubber carcass stock. The plasticizer was prepared from 100 parts by weight of liquid polybutadiene having a viscosity of 460 Saybolt Furol seconds at 100° F., 5 parts sulfur, and 2 parts butylzimate. The mixture was vulcanized at 210° F. for 5 hours and the resulting material incorporated into a 14° F., butadiene/styrene, 53 Mooney (ML–4) polymer, prepared by emulsion polymerization methodes wherein the charge ratio was 72:88 parts by weight butadiene to styrene. Two blends of the vulcanized liquid polybutadiene with Paraflux, and a control using a Paraflux-Staybelite Resin blend were also evaluated. The following basic recipe was employed:

| | Parts by weight |
|---|---|
| Butadiene/styrene copolymer | 100 |
| Philblack O | 25 |
| Zinc oxide | 3.0 |
| Stearic acid | 1.0 |
| Agerite resin D [1] | 1.0 |
| Plasticizers | Variable |
|   Vulcanized liquid polybutadiene | |
|   Paraflux [2] | |
|   Staybelite resin [3] | |
| Sulfur | 2.5 |
| Santocure | 1.0 |
| A–32 [4] | 0.2 |

[1] Polymerized trimethyldihydroquinoline.
[2] An asphaltic flux.
[3] Hydrogenated rosin.
[4] Reaction product of butyraldehyde and butylidene aniline.

The stocks were milled and cured 30 minutes at 307° F.

| Plasticizer Sample No. | 80° F. | | | Percent Compression Set | Extraction | | |
|---|---|---|---|---|---|---|---|
| | 300% Modulus, p. s. i. | Tensile, p. s. i. | Percent Elongation | | Percent Swelling | Percent Extracted (Gravimetric [1]) | Calc. Percent Extracted [2] |
| 1 | 2,120 | 2,200 | 305 | 13.9 | 55.1 | 2.0 | 1.6 |
| 2 | 2,290 | 2,350 | 305 | 11.1 | 54.4 | 1.8 | 1.8 |
| 3 | | 2,310 | 285 | 14.5 | 49.9 | 1.9 | 1.8 |
| 4 | | 2,340 | 280 | 15.3 | 47.5 | 1.6 | 1.4 |
| 5 | 2,180 | 2,230 | 305 | 13.9 | 51.4 | 2.1 | 2.0 |
| Liquid Polybutadiene | 1,370 | 1,730 | 370 | 15.9 | 64.8 | 2.1 | 2.2 |
| Flexol TOF | 2,070 | 2,370 | 330 | 14.7 | 35.5 | 5.8 | 6.5 |
| TP–90B | 2,170 | 2,410 | 320 | 16.8 | 36.3 | 5.8 | 5.8 |

[1] These values were obtained by evaporating an aliquot portion of the solvent after extraction.
[2] These values were obtained from the original and dried extracted specimen weights.

The vulcanized plasticizers had much higher swelling and extractability values than the commercial softener controls, Flexol TOF and TP–90B, and were superior to the unvulcanized liquid polybutadiene in modulus and tensile strength.

and physical properties determined. The following results were obtained:

| Softener | PHR Softener | 80° F. | | | 200° F.[1] | | ΔT. ° F. | Percent Resilience | Flex Life at 210° F. M | Shore Hardness | Percent Comp. Set | MS 1½ at 212° F. | Meter Tack, Grams |
|---|---|---|---|---|---|---|---|---|---|---|---|---|---|
| | | 300% Modulus p. s. i. | Tensile, p. s. i. | Percent Elongation | Tensile, p. s. i. | Percent Elongation | | | | | | | |
| Vulc. liquid PBD | 7.5 | 1,080 | 2,900 | 510 | 650 | 180 | 34.8 | 78.2 | 1.4 | 55 | 11.0 | 31.5 | 200 |
| Vulc. liquid PBD-Paraflux | 5.0-2.5 | 1,030 | 2,860 | 540 | 630 | 195 | 33.8 | 78.4 | 1.7 | 55 | 11.1 | 29.5 | 180 |
| Vulc. liquid PBD-Paraflux | 2.5-5.0 | 975 | 2,550 | 500 | 680 | 215 | 33.5 | 78.8 | 1.3 | 54.5 | 11.8 | 29.0 | 60 |
| Paraflux-Staybelite Resin | 5.0-2.5 | 930 | 3,125 | 570 | 670 | 245 | 34.8 | 78.0 | 2.3 | 54 | 13.4 | 31.0 | 30 |

OVEN AGED 24 HRS. AT 212° F.

| | | | | | | | | | | | | | |
|---|---|---|---|---|---|---|---|---|---|---|---|---|---|
| Vulc. liquid PBD | 7.5 | 1,800 | 2,340 | 340 | | | 33.1 | 80.2 | 0.6 | 58 | | | |
| Vulc. liquid PBD-Paraflux | 5.0-2.5 | 1,630 | 2,240 | 370 | | | 34.4 | 81.5 | 0.6 | 58 | | | |
| Vulc. liquid PBD-Paraflux | 2.5-5.0 | 1,540 | 2,070 | 365 | | | 33.1 | 81.9 | 0.6 | 58 | | | |
| Paraflux-Staybelite Resin | 5.0-2.5 | 1,500 | 2,280 | 375 | | | 32.8 | 80.9 | 0.3 | 56 | | | |

[1] 45 minute cures.

Example V

A sample of liquid polybutadiene was prepared as described in Example I and the product was employed for the preparation of two vulcanized plasticizers, designated as samples 1 and 2. The same amount of sulfur was used in each case and curing was effected at 210° F., in one instance for five hours and in the other for three hours. The two vulcanized plasticizers were evaluated alone in the compounding recipe of Example I with the rubber stock described therein and various mixtures of each of these plasticizers with a blend of equal parts of Circosol–2XH with Paraflux (previously defined) were also evaluated. Two controls were run, designated as control A and control B (see Example I). The softener loading in each case was 5 parts.

The stocks were milled and cured 30 minutes at 307° F. and physical properties determined. The amounts of materials employed in the preparation of the vulcanized plasticizers, per 100 parts liquid polybutadiene, together with the curing time, and the physical properties of the compounded rubber stocks are recorded below.

2. The vulcanizable composition of claim 14 wherein said vulcanized polymer is prepared from a liquid unvulcanized copolymer of butadiene and styrene.

3. The composition of claim 14 wherein said vulcanizable elastomer is a copolymer prepared by copolymerization of butadiene and styrene monomers in an emulsion system at a temperature of from —20 to 15° C., said butadiene being present in an amount of from 50 to 85 weight per cent of the total weight of said monomers, said vulcanized polymer having been prepared from a liquid polymer having a viscosity of from 100 to 6000 Saybolt Furol seconds at 100° F.

4. The composition of claim 3 wherein said vulcanized polymer is a polymer prepared from liquid unvulcanized polybutadiene.

5. The composition of claim 14 wherein said vulcanizable elastomer is natural rubber.

6. The process of claim 15 wherein said vulcanized

| Sample | Softener Loading, PHR | Sulfur, Parts | Butyl Zimate, Parts | Curing Time, Hours | 80° F. | | | 200° F.[a] | |
|---|---|---|---|---|---|---|---|---|---|
| | | | | | 300% Modulus, p. s. i. | Tensile, p. s. i. | Percent Elongation | Tensile, p. s. i. | Percent Elongation |
| 1 | 5 | 5 | 2 | 5 | 1,750 | 3,500 | 490 | 2,090 | 300 |
| 2 | 5 | 5 | 2 | 3 | 1,830 | 3,720 | 505 | 2,120 | 325 |
| 1 Circosol-Paraflux | 1 4 | | | | 1,740 | 3,700 | 525 | 2,210 | 340 |
| 1 Circosol-Paraflux | 2 3 | | | | 1,770 | 3,700 | 510 | 2,480 | 360 |
| 1 Circosol-Paraflux | 3 2 | | | | 1,680 | 3,920 | 550 | 1,960 | 310 |
| 1 Circosol-Paraflux | 4 1 | | | | 1,710 | 3,990 | 550 | 2,080 | 300 |
| 2 Circosol-Paraflux | 3 2 | | | | 1,790 | 3,890 | 535 | 2,200 | 350 |
| 2 Circosol-Paraflux | 4 1 | | | | 1,940 | 4,000 | 530 | 2,280 | 360 |
| Control A: Circosol-Paraflux | 5 | | | | 1,820 | 3,720 | 515 | 2,290 | 335 |
| Control B: Unvulcanized Liquid Polybutadiene | 5 | | | | 1,580 | 3,780 | 550 | 2,260 | 340 |

| Sample | AT. ° F. | Percent Resilience | Flex Life, M | Shore Hardness | Abrasion Loss,[b] Grams | Percent Compression Set | MS 1½ at 212° F. | Meter Tack, 1 Day Sep'n, Grams |
|---|---|---|---|---|---|---|---|---|
| 1 | 73.0 | 65.7 | 30.3 | 62.5 | 5.32 | 13.1 | 47.0 | 125 |
| 2 | 74.0 | 65.5 | 17.4 | 63 | 5.17 | 13.8 | 48.0 | 120 |
| 1 Circosol-Paraflux | 76.7 | 64.3 | 45.1 | 62 | 5.09 | 15.4 | 45.5 | 70 |
| 1 Circosol-Paraflux | 76.7 | 64.4 | 26.7 | 62 | 5.25 | 15.2 | 46.0 | 75 |
| 1 Circosol-Paraflux | 75.0 | 64.7 | 25.0 | 62 | 5.35 | 14.6 | 46.5 | 110 |
| 1 Circosol-Paraflux | 75.0 | 65.0 | 33.0 | 63 | 5.21 | 13.6 | 48.0 | 125 |
| 2 Circosol-Paraflux | 74.3 | 65.3 | 23.1 | 62 | 5.11 | 15.2 | 46.5 | 80 |
| 2 Circosol-Paraflux | 75.3 | 64.8 | 29.1 | 63 | 5.24 | 14.2 | 47.5 | 110 |
| Control A: Circosol-Paraflux | 76.3 | 64.1 | 20.5 | 62 | 5.23 | 16.7 | 45.0 | 60 |
| Control B: Unvulcanized Liquid Polybutadiene | 79.1 | 63.4 | 26.1 | 61 | 4.86 | 17.3 | 45.0 | 90 |

[a] 45 minute cure.
[b] 35 minute cure.

It is noted that the sample containing the Circosol-Paraflux blend showed a tack of 60 while those containing the blends of Circosol-Paraflux with the vulcanized liquid polybutadiene plasticizers gave higher values. As the amount of the vulcanized plasticizer in the blend was increased, the tack improved. It is also noted that the vulcanized softeners accelerated the cure when compared to the controls. This fact is indicated by the compression set results for the individual vulcanized plasticizers and also the blends containing these materials.

As will be evident to those skilled in the art, various modifications of this invention can be made, or followed, in the light of this disclosure and discussion, without departing from the spirit or scope of this disclosure or from the scope of the claims.

We claim:

1. The vulcanizable composition of claim 14 wherein said vulcanized polymer is a polymer prepared from liquid unvulcanized polybutadiene.

polymer is prepared from liquid unvulcanized polybutadiene having a viscosity in the range from 100 to 6000 Saybolt Furol seconds at 100° F.

7. The process of claim 15 wherein said vulcanized polymer is prepared from a liquid unvulcanized copolymer of butadiene and styrene having a viscosity in the range from 100 to 6000 Saybolt Furol seconds at 100° F.

8. A sulfur vulcanizable composition comprising, 100 parts by weight of a vulcanizable organic elastomer selected from the group consisting of natural rubber, diolefin polymers and copolymers of diolefins and comonomers containing the terminal group $CH_2=C<$ and 1 to 25 parts by weight of a sulfur vulcanized polymer prepared from unvulcanized liquid polymers selected from the group consisting of liquid polymers of aliphatic conjugated diolefins and copolymers of aliphatic conjugated diolefins and comonomers containing the terminal group $CH_2=C<$, said liquid polymer having a molecular weight in the range of 500 to 5000.

9. In the process of processing sulfur vulcanizable organic elastomers selected from the group consisting of natural rubber, diolefin polymers and copolymers of diolefins and comonomers containing the terminal group $CH_2=C<$, to produce elastomer products, that improvement which comprises, adding to 100 parts by weight of said vulcanizable organic elastomer, as a plasticizer, 1 to 25 parts by weight of a sulfur vulcanized polymer prepared from unvulcanized liquid polymers selected from the group consisting of liquid polymers of aliphatic conjugated diolefins and copolymers of aliphate conjugated diolefins and comonomers containing the terminal group $CH_2=C<$, said liquid polymer having a molecular weight in the range of 500 to 5000.

10. A sulfur vulcanizable composition comprising, 100 parts by weight of rubber and 1 to 25 parts by weight of a vulcanized polymer prepared from unvulcanized liquid polymers seelcted from the group consisting of liquid polymers of aliphatic conjugated diolefins and liquid polymers of aliphatic conjugated diolefins and comonomers containing a terminal $CH_2=C<$ which are copolymerizable therewith.

11. In the process of processing sulfur vulcanizable rubbers, that embodiment which comprises, adding to 100 parts by weight of said rubber, as a plasticizer, 1 to 25 parts by weight of a vulcanized polymer prepared from unvulcanized liquid polymers selected from the group consisting of liquid polymers of aliphatic conjugated diolefins and liquid polymers of aliphatic conjugated diolefins and comonomers containing a terminal $CH_2=C<$ which are copolymerizable therewith.

12. A sulfur vulcanizable composition comprising, 100 parts by weight of rubber and 1 to 25 parts by weight of a vulcanized polymer prepared from an unvulcanized liquid homopolymer of a conjugated diolefin.

13. In the process of processing sulfur vulcanizable rubbers, that embodiment which comprises adding to 100 parts by weight of said rubber, as a plasticizer, 1 to 25 parts by weight of a vulcanized polymer prepared from an unvulcanized liquid homopolymer of a conjugated diolefin.

14. A sulfur vulcanizable composition comprising 100 parts by weight of a vulcanizable organic elastomer selected from the group consisting of natural rubber, diolefin polymers and copolymers of diolefins and comonomers containing the terminal group $CH_2=C<$ and 1 to 25 parts by weight of a sulfur vulcanized polymer prepared from unvulcanized liquid polymers selected from the group consisting of liquid polymers of aliphatic conjugated diolefins and copolymers of aliphatic conjugated diolefins and comonomers containing the terminal group $CH_2=C<$.

15. In the process of processing sulfur vulcanizable organic elastomers selected from the group consisting of natural rubber, diolefin polymers and copolymers of diolefins and comonomers containing the terminal group $CH_2=C<$ to produce elastomer products, that improvement which comprises adding to 100 parts by weight of said vulcanizable organic elastomer as a plasticizer 1 to 25 parts by weight of a sulfur vulcanized polymer prepared from unvulcanized liquid polymers selected from the group consisting of liquid polymers of aliphatic conjugated diolefins and copolymers of aliphatic conjugated diolefins and comonomers containing the terminal group $CH_2=C<$.

References Cited in the file of this patent

UNITED STATES PATENTS

| | | |
|---|---|---|
| 2,521,361 | Gessler | Sept. 5, 1950 |
| 2,583,387 | Morrissey et al. | Jan. 22, 1952 |
| 2,631,175 | Crouch | Mar. 10, 1953 |